May 3, 1966  J. VOORDOUW  3,248,784
APPARATUS FOR ASSEMBLING PARTS
Filed Sept. 17, 1964  5 Sheets-Sheet 1

INVENTOR.
JACOBUS VOORDOUW
BY
AGENT

May 3, 1966 J. VOORDOUW 3,248,784
APPARATUS FOR ASSEMBLING PARTS
Filed Sept. 17, 1964 5 Sheets-Sheet 2

INVENTOR.
JACOBUS VOORDOUW
BY
AGENT

May 3, 1966 J. VOORDOUW 3,248,784
APPARATUS FOR ASSEMBLING PARTS
Filed Sept. 17, 1964 5 Sheets-Sheet 3

INVENTOR.
JACOBUS VOORDOUW
BY
Frank R. Trifari
AGENT

May 3, 1966  J. VOORDOUW  3,248,784
APPARATUS FOR ASSEMBLING PARTS
Filed Sept. 17, 1964  5 Sheets-Sheet 5

INVENTOR.
JACOBUS VOORDOUW
BY
Frank R. Trifari
AGENT

United States Patent Office 3,248,784
Patented May 3, 1966

3,248,784
APPARATUS FOR ASSEMBLING PARTS
Jacobus Voordouw, Emmasingel, Eindhoven, Netherlands, assignor to North American Philips Company, Inc., New York, N.Y., a corporation of Delaware
Filed Sept. 17, 1964, Ser. No. 397,122
Claims priority, application Netherlands, Sept. 18, 1963, 298,077
4 Claims. (Cl. 29—203)

The invention relates to apparatus for assembling parts for electron tubes and the like.

The known assembly apparatus comprises a plurality of holders in the form of magazines spaced in a circle concentric with the axis of the apparatus, a plurality of identical parts being kept on hand in each magazine or holder. In the known apparatus, a mounting head is displaceable along the lower side of these magazines. During each period of standstill of the mounting head, one of the parts is removed from the magazine then situated above this head and inserted by one or more of its projections into associated perforations of a plate of mica or the like secured against the mounting head. To this end, the known apparatus is provided with several conveying members each of which first removes a given part from its magazine, conveys it over a distance essentially different for each part to the mounting head and then insert it with a certain amount of clamping force into the mica plate. Consequently, parts are inserting successively into the perforations of the mica plate and the assembly or electron tube packet is then gradually built up.

In the known assembly apparatus, the said conveying members must fulfill several functions while nevertheless the parts must be mounted with great accuracy, therefore this apparatus is comparatively complicated.

The invention has for its object to provide a considerably simplified assembly apparatus.

The assembly apparatus according to the invention is characterized in that a holder is provided having a plurality of locations which hold one series of parts for an electron tube or the like, the relative depths of the parts held in their locations being such that a single mounting head arranged above the holders moves the same distance each time a part is added as the assembly is built up. The mounting head removes the parts from the holder and as a result separate conveying members, as described hereinbefore in connection with the known apparatus, are completely superfluous. By assembling parts in an overhead mica plate or the like, the advantage is obtained that the possibility of dust accumulation is considerably smaller than when parts are assembled in the known manner from above on an underlying mica plate.

The arrangement in accordance with the invention is particularly suitable for use in the manufacture of packets for electron tubes in quantities which are not great enough to justify the acquisition of fully-automatic machine. The mounting arrangement according to the invention is especially suitable to be used as a semi-automatic machine; the insertion movement and the displacements of the holder with respect to the mounting head may then be effected automatically, while, for example, the holders may be filled with one series of parts manually by essentially unskilled labourers.

With the method according to the invention of mounting in an upward direction, it can be ensured on the one hand that the locations in the holders are constructed so that the parts are held therein so as to be readily detachable, while on the other hand the perforations in the mica plate are proportioned so that they may tightly surround the projections of the parts. When these conditions are fulfilled, a given part may be removed from its location and be held by its projections in the mica plate when the mounting head and the holders move away from each other.

A mounting head in accordance with the invention, provides assurance that a part, once inserted into perforations is in a mica plate, certain to be removed from its location in the holder. The mounting head thus comprises one or more clamping members, such as, for example, spring-loaded claws which upon separation of the mounting head and the holders clamps one or more of the projections of the part inserted into the mica plate, while this part is being removed from its location in the holders.

In accordance with the invention, the holders for the various parts are constituted by an elongated plate or strip provided with several recesses comprising receptacles of holding means. This strip is displaceable in a guide, by stepwise movement and the mounting head, also displaceable in a guide, being capable of moving up and down during each period of standstill of the strip. Consequently, the assembly apparatus preferably comprises a plurality of these strips which are manually filled with parts and which are successively coupled with one of several mounting heads. While an assembly per se is made automatically on a base plate of mica placed over the free projections of the assembled parts, a second mica plate may be arranged manually with the assembly held in a mounting head and this head is then emptied. Comparatively unskilled labourers may be used for mounting the second mica plate, emptying the mounting heads and filling the holder strips, however the parts are assembled in a fully-automatic manner.

The invention will now be described more fully with reference to the accompanying drawing, in which:

FIG. 1 is a front elevation and FIG. 2 a sectional view taken on the line II—II of FIG. 1 of the apparatus in accordance with the invention.

FIG. 3 relates to a diagrammatic embodiment of a grid packet which may be mounted on a mica plate with the aid of the arrangement shown in FIGS. 1 and 2;

Figure 1:
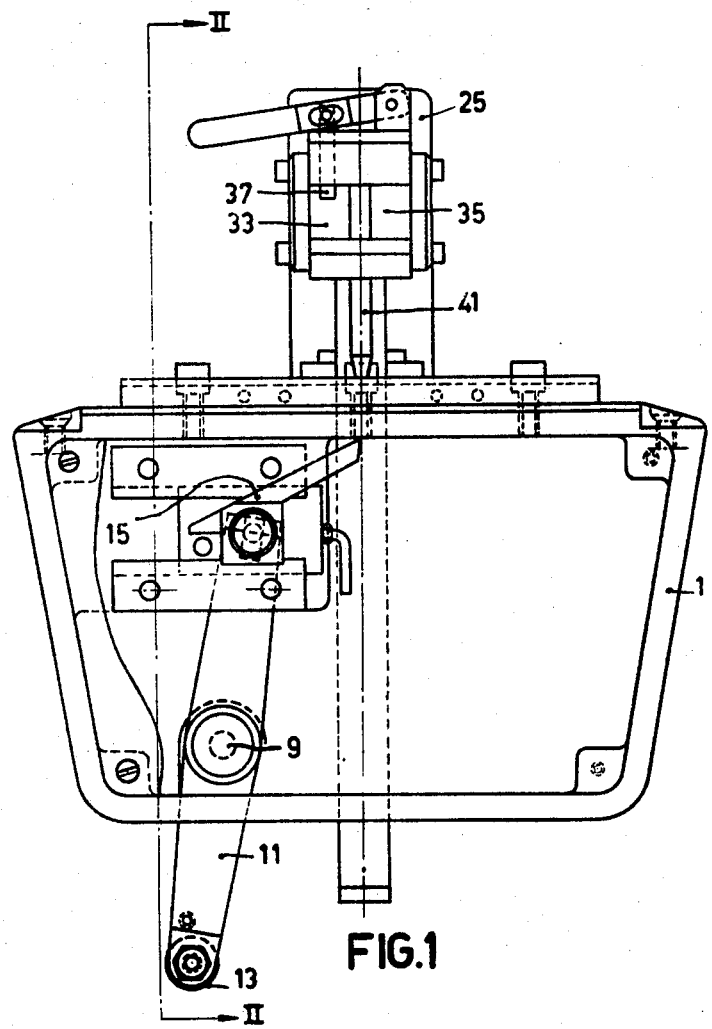
Figure 2:
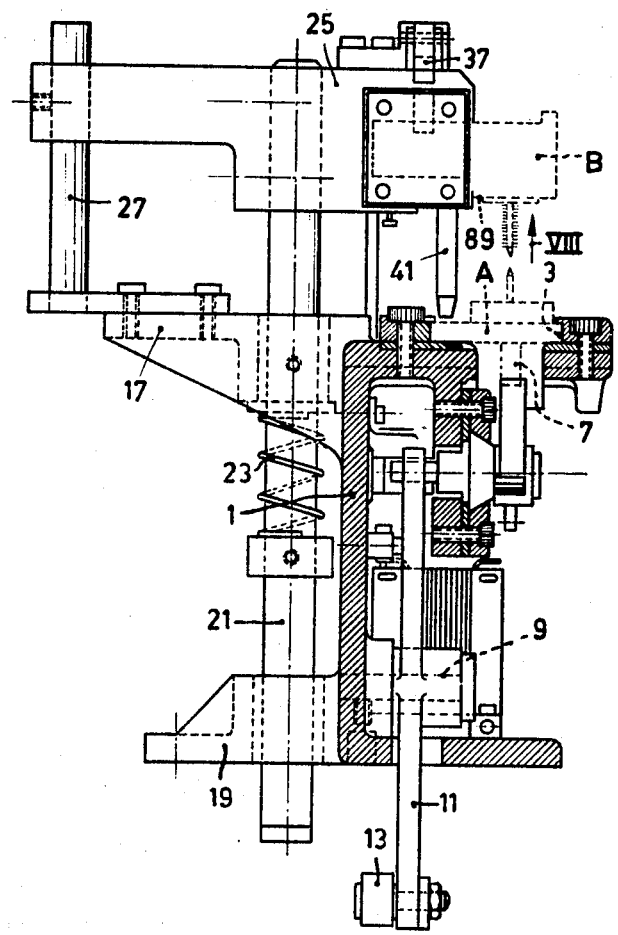
Figure 5:
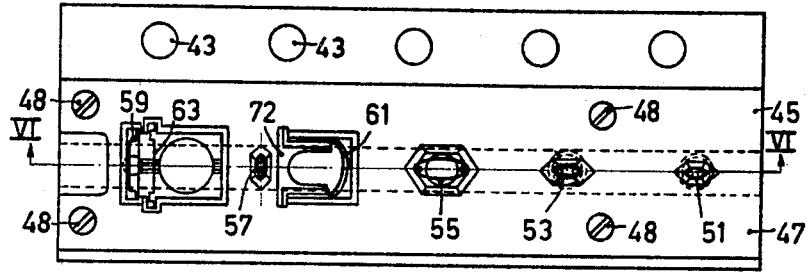
FIGS. 4, 5 and 6 are a side elevation, a plan view and an elevation taken on the line VI—VI of FIG. 5 of a strip holding parts.
Figure 6:
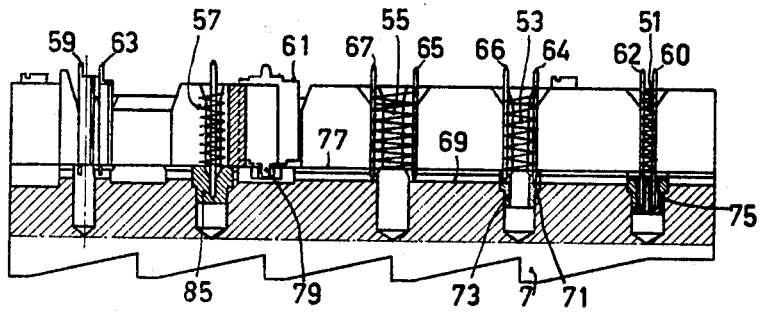
Figure 4:
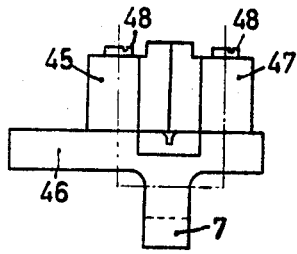
Figure 7:
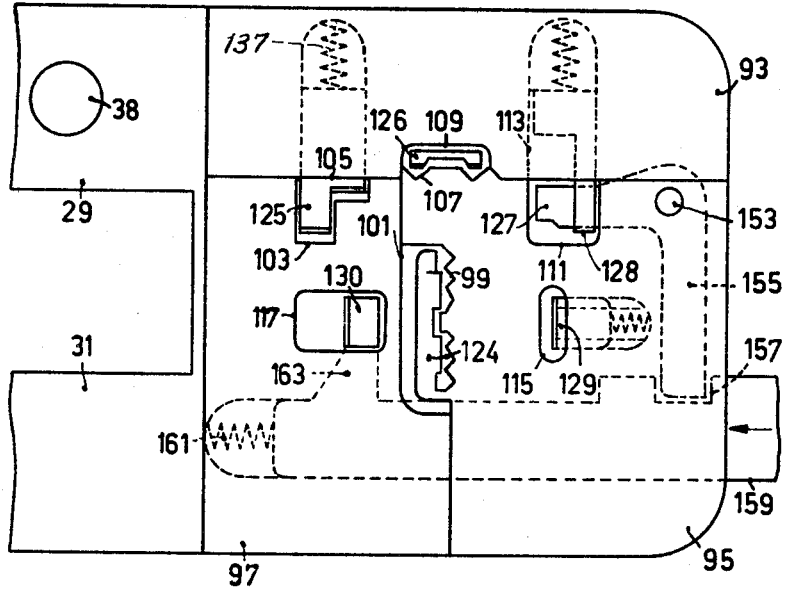
FIG. 7 is an elevation in the direction of the arrow VII of FIG. 2 of a mounting head in the mounting arrangement in accordance with the invention.

The arrangement in accordance with the invention comprises a frame 1. A guide 3 is provided on the upper side of this frame. A strip A shown diagrammatically in broken lines in FIG. 2 is displaceable in this guide. This strip A, which is shown in greater detail in FIGS. 4, 5 and 6, is provided with a saw tooth projection 7 which cooperates with a mechanism provided by a lever 11 rotatable around a shaft 9, the end of this lever comprising a cam roller 13, while its other end is provided with a pawl mechanism 15 co-operating with the teeth of projection 7 in a manner usual for stepwise movements. The stepwise displacement of the said strip A inside the guide 3 is achieved by oscillatory movement of the lever 11 about pivot 9 as a result of the co-operation between the roller 13 and a suitable cam (not shown).

The frame 1 has a few flange-shaped parts 17 and 19 which constitute a guide for a rod 21 which is moved regularly upwards and downwards by a cam (not shown). The spring 23 normally presses the rod 21 downwards.

A structural part 25 is secured to the rod 21. By moving the rod 21 upwards and downwards, the part 25 is consequently also moved up and down, this part 25 being guided by a pin 27. A mounting jig B (see FIGS. 7 to 10) can be secured in this structural part 25. This mounting jig B, which is shown by broken lines in FIG. 2, has limbs 29 and 31 which fit into apertures 33 and 35 of the structural part 25. The limbs 29 and 31 may be fixed in these apertures 33 and 35 with the aid of a resiliently arranged pin 37 (FIG. 2) fitting into an aperture 38 of the part 25.

The controls or cams for movement of the rod 21 and the cam roller 13 are ganged so that first the mounting jig B is moved upwards and only then is the strip A displaced in the guide 3 a distance corresponding to the pitch of the teeth 7. For centering the strip A during the period of standstill use is made of a centering pin 41 which is secured to the structural part 25 and which co-operates with one of the apertures 43 of the base plate 46 of the strip A.

Figure 3:
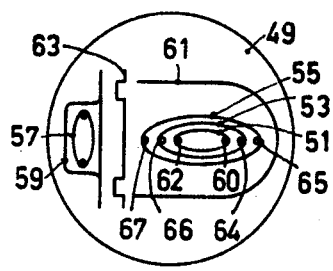

The strip A (see FIGS. 4, 5, 6) comprises a base plate 46 and parts 45 and 47 secured thereto by means of screws 48. As shown, these parts 45 and 47 are provided with a plurality of recesses which together contain a series of parts of an electron tube. These parts are shown diagrammatically in FIG. 3 in the position in which they are mounted on a mica plate 49. The tube parts are constituted in this case of four grids 51, 53, 55, 57 and by two plate-shaped anodes 59 and 61 and an intermediate screen 63. The various recesses in the strip A are shaped so that the parts 51, 53, 55, 57, 59, 61, 63 shown in FIGS. 5 and 6 can occupy therein only one prescribed position. When the strip A is filled, it is consequently impossible for a part to get into a wrong recess. The said recesses in this strip constitute, as it were, locations for the various parts. As seen in FIG. 6, steps have further been taken to maintain accurately prescribed maximum depths in the strip for the various grids 51, 53 and 55. The grid beams 65 and 67 of the grid 55 bear on the face 60. The grid beams 64 and 66 of the grid 53 on the contrary bear on the bearing face 71 of an insertion piece 73, while the grid beams 60 and 62 of the grid 51 bear on the insertion piece 75. The plate-shaped anode 61 is disposed in the recess corresponding with this part and bears on the edge 77 of the jig. The said corresponding recess contains an insertion piece 72. The anode has a few tabs 79 at least one of which must be bent over after they have been inserted into corresponding apertures in the mica plate 49. The grid beams of the grid 57 bear in grooves of a corresponding insertion piece 85. With the aid of the said insertion pieces and edges of application, the insertion depths of the recesses into which the various parts fit accurately, are limited. The strip A is therefore designed so that it can contain only one series of parts for only one electron tube.

Figure 8:
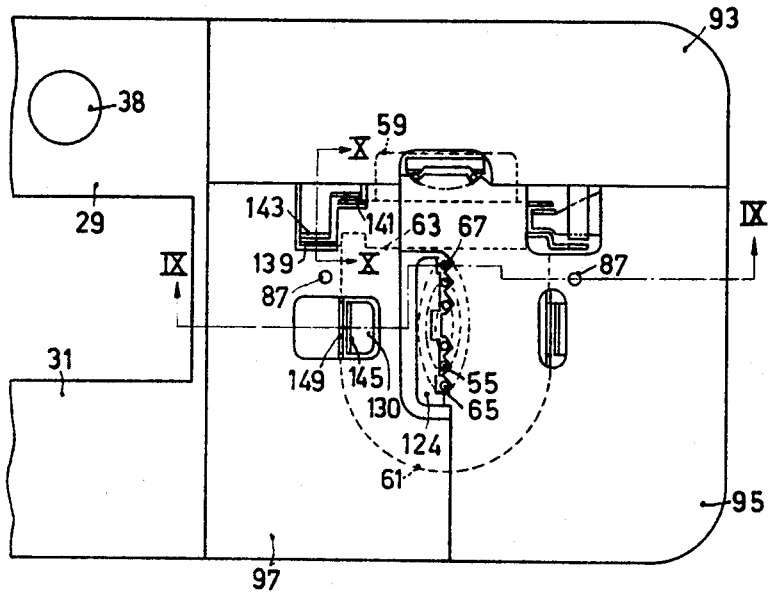
FIG. 8 is an elevation similar to that of FIG. 7 in which for the sake of clarity the various parts of the same packet are shown diagrammatically with the omission of the insulating mica plate.

The mounting head B (see FIGS. 2, 7 and 8) arranged over the strip A contains a plurality of pins 87 (FIGS. 8, 9) which project below the lower face 89 of head B. The diameters of these pins are chosen with respect to corresponding perforations in the mica plate 49 so that a mica plate once pressed from below against the face 89 and slipped on the pins 87 is held against the head B by these pins. The mounting head is of composite nature. It comprises parts 93, 95 and 97 which together constitute the face 89 which contains several recesses. These recesses are successively limited by the jagged line 99 and the line 101, the broken line 103 and the line 105, the toothed line 107 and the line 109, the lines 111 and 113, the closed curve 115 and the closed curve 117. Claws 124, 125, 126, 127, 128, 129, 130 are movably arranged in the said recesses. These claws are displaceable so that the projections of the parts inserted into the mica plate can be clamped between each claw and the limiting edge of the associated recess, and may be bent over. These projections are shown in FIG. 8 with full lines, while the parts of the tube not co-operating with the claws are indicated with broken lines. The projections of the tube parts may be in the form of tongs or grid beams.

Figure 9:
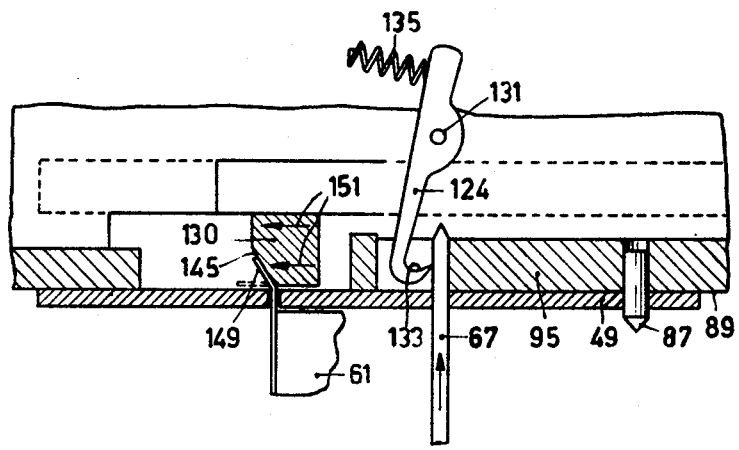
FIGS. 9 and 10 are sectional views taken on the lines IX—IX and X—X of FIG. 8.
Figure 10:
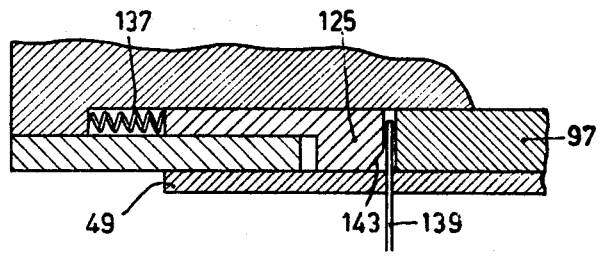

The co-operation between the various claws and the projections of the tube parts will be apparent from FIGS. 9 and 10. For example, in FIG. 9, the mica plate is designated by 49 and a grid beam 67 of the grid 55 is inserted into the mica plate. The claw 124 is connected with a tensile spring 135 at one end and is rotatable around a shaft 131; the claw 124 is provided with a knife-shaped edge 133 which constantly urges the grid beam 67, inserted into the mica plate 49, against the part 95. The insertion of the grid beam 67 into the mica plate 49 and the slight turn of the claw 124 towards the position shown are facilitated by providing the grid beam with a tapering end. Instead of using pivotal claws, use may also be made of a structure shown in FIG. 10. The claw or slide 125 acted upon by a compression spring 137 may urge the tags 139 and 141 of the plate-shaped anodes 63 and 59 (FIGS. 3 and 8) inserted into the mica plate 49, against a wall portion of the part 97. Also in this case, the claw 125 is constructed so as to perform a searching movement in order to facilitate the insertion of the said tongs; this claw has a bevelled edge 143.

If it is desirable moreover to bend over the tags of the plate-shaped anodes inserted into the perforations in the mica plate 49, the claw may be movably arranged as is shown in FIG. 9, for example, for the claw 130. This claw also has a bevelled edge 145. After the tong 149 of the anode 61 has been inserted into the mica plate 49, it may be bent over by moving the claw 130 in the direction of the arrow 151. To this end, the mounting head is provided with members for the operating of the claws 130 and 127. These members are shown diagrammatically in FIG. 7. The claw 127 forms part of a lever 155 rotatable around a shaft 153. This claw 155 engages a recess 157 of a rod 159 at the end of which a compression spring 161 is arranged. The rod 159 has a bulging part 163 on which the claw 130 is provided. The further guiding of the rod 159 is not further described herein.

The arrangement operates as follows:

First the strip A is provided with a plurality of tube parts shown in FIGS. 5, 6 each part being inserted to a depth determined by the insertion pieces 71, 85 and so on of the corresponding recess in the strip A. The tube parts can be placed in corresponding recesses by relatively unskilled laborers. This strip A is then slipped into the guide 3 of the frame 1.

Subsequently, the limbs 29 and 31 of the mounting head B are inserted into the recesses 33 and 35 of the structural part 25 and fixed therein with the aid of the resiliently arranged pin 37. A plate 49 of mica or the like has beforehand been slipped on the pins 87 and is held in place as a result of the frictional forces between the pins 87 and the perforations receiving said pins. Subsequently, the actuation of the rod 21 and of the cam roller 13 of the lever 11 is put in operation. As a result, strip A is displaced in a step-wise manner and during each period of standstill in this displacement, a part or a combination of parts is situated just below the mounting head B. At that moment, the head B moves downwards and the strip A, viewed in its direction of displacement, is locked by the pin 41. At a given moment during this downward movement of the head B, the mica plate 49 will touch the upwardly directed ends of the grid beams 60, 62 of the grid 51. During the continued downward movement of the head B, the tapering ends of the grid beams disappear in corresponding perforations of the mica plate and these grid beams push the claw 124 slightly aside against the action of the spring 135. Subsequently, the mounting head B is again moved towards its initial position (upward). During this upward movement of the head B, the rotatable claw 124 continues to exert a given amount of clamping force, which results in that the grid 51 is removed from its recess in the strip A.

After the grid 51 has thus been removed from the strip A and the mounting head B has been moved back to its highest position, the strip A is displaced along a distance corresponding with the pitch of a tooth 7 so that the subsequent grid 53 is situated below the mounting head B. This grid 53 is wider than the grid 51. During the downward movement of the mounting head B, the grid beams 64 and 66 are now inserted in an analogous manner into corresponding perforations of the mica plate 49. During this downward movement, the preceding grid 51 already secured in the mounting head B is consequently also moved downwards and this narrower grid disappears inside the subsequent grid 53. This preceding grid does not find a limitation in depth in the strip A with this downward movement and consequently performs, as it were, a free movement. Approximately at the end of the downward movement, the likewise punctiform ends of the beams 64 and 66 reach the aperture already existing between the slightly turned claw 124 and the toothed rim 99 of the part 95. This claw is then turned still further so that approximately at the end of the downward stroke the beams 64 and 66 are clamped; during the subsequent upward movement of the mounting head B, the grid is consequently drawn out of the strip. It is no longer disadvantageous that the clamping force exerted upon the grid beams 60 and 62 of the preceding grid is eliminated, since the grid 51 can be held with sufficient tightness by the corresponding perforations in the mica plate 49. After a following step of the mounting head, the grid 55, which has again a larger width than that of the grid 53, is inserted in an analogous manner into the mica plate 49.

In the embodiment chosen, the successive grids 51, 53, 55 exhibit increasing transverse dimensions and the concerned grid beams have increasing diameters, the side flank of the claw 124 is consequently provided with steps in order to ensure that the grid beams of the concerned grid are actually clamped during the upward movement of the mounting head B.

After a continued displacement of the strip A, two parts are simultaneously removed from their locations in the strip, that is to say the grid 57 and the plate-shaped anode 61. At that moment, already five different parts are already secured in the mounting head B. Finally, after a final step, the last two parts (59 and 63) are likewise inserted simultaneously into the mica plate 49 and the stepwise displacement of the strip A is terminated in a manner not further described. Subsequently, the strip A is removed from its guide in order to be filled again. Then the mounting head B, carrying the tube assembly, is also removed from the structural part 25. This mounting head is then turned upright down so that the parts are directed upwards and a second mica plate can then be manually slipped on to the free projections at the other ends of the parts.

The described arrangement is very suitable for use as a semi-automatic arrangement, the exchangeable parts of which are constituted by the strip A and the mounting head B.

What is claimed is:

1. Apparatus for assembling parts comprising a frame member, a mounting head adapted to receive a mounting plate, said head being supported on said frame for stepwise reciprocal movement in a plane, said mounting head having means defining a plurality of openings in said head, each said opening being adapted to receive one of a series of parts to be assembled, an elongated parts holder, means in said frame for supporting said holder for sliding stepwise lineal movement substantially orthogonally with respect to said plane, means for imparting movement alternately to said head and holder in timed relation, said elongated parts holder having a plurality of configured recesses for supporting a series of parts to be successively assembled in said head, each successive recess being adapted to hold an electric component of an electric assembly and to be successively aligned with said mounting head by said means for imparting movement to said parts holder, said parts holder having means defining prescribed depths in said recess, said recesses being arranged for freely receiving in an inverted position each part of the series of parts to be inserted in said head.

2. Apparatus according to claim 1 wherein said mounting head comprises a number of configured composite parts for defining said plurality of openings in said head, said openings being adapted to receive a projection of each of said series of parts, and means supported on said head and operatively connected with said openings for holding said projection in said openings.

3. Apparatus according to claim 1 wherein said elongated parts holder comprises a number of configured composite parts mounted on a base plate, said base plate having a rack for engaging said means for imparting stepwise movement to said parts holder.

4. Apparatus according to claim 3, with the addition of means for centering said elongated parts holder relative to said mounting head; said means for centering said parts holder comprising a series of apertures in said base plate, said apertures being located relative to the teeth of said rack, and a tapered locating pin operatively connected with said mounting head for successively entering said apertures.

References Cited by the Examiner

UNITED STATES PATENTS

| | | | |
|---|---|---|---|
| 1,775,029 | 9/1930 | Hippenmeyer | 198—135 X |
| 2,238,921 | 4/1941 | Waldsmith | 29—33.12 |
| 2,392,169 | 1/1946 | Mansfield | 29—33.12 |
| 2,831,239 | 4/1958 | Pilas et al. | 29—25.19 |
| 2,845,108 | 7/1958 | Hammell et al. | 29—203 |
| 2,907,040 | 10/1959 | Woods | 29—203 |
| 3,102,331 | 9/1963 | DaCosta | 29—203 |
| 3,114,199 | 12/1963 | Flodberg | 29—203 |

WHITMORE A. WILTZ, *Primary Examiner.*

THOMAS H. EAGER, *Examiner.*